(12) United States Patent
Takahashi et al.

(10) Patent No.: US 6,601,807 B1
(45) Date of Patent: Aug. 5, 2003

(54) MOUNTING STRUCTURE OF THERMAL SHIELD FOR OIL PUMP

(75) Inventors: Shigemi Takahashi, Okazaki (JP); Takashi Imanishi, Okazaki (JP); Masayuki Sekine, Okazaki (JP); Shuji Nakamura, Toyota (JP); Yoshihisa Kato, Aichi-ken (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/629,625

(22) Filed: Jul. 31, 2000

(30) Foreign Application Priority Data

Jul. 30, 1999 (JP) ............................................. 11-216519

(51) Int. Cl.⁷ ................................................. F16M 1/00
(52) U.S. Cl. ............................. 248/200; 60/322; 92/140
(58) Field of Search .......................... 248/200; 181/204, 181/211, 209; 60/320, 321, 322, 323, 324; 92/161, 140; 417/368

(56) References Cited

FOREIGN PATENT DOCUMENTS

| JP | 7-102965 | * | 4/1995 |
| JP | 10-263716 | * | 10/1998 |

* cited by examiner

Primary Examiner—Korie Chan
Assistant Examiner—Steven Marsh
(74) Attorney, Agent, or Firm—Oblon, Spivak, McClelland, Maier & Neustadt, P.C.

(57) ABSTRACT

It is an object of the present invention to provide a mounting structure of a thermal shield for an oil pump which makes it possible to securely mount the thermal shield at one point with high reliability and at a low cost. To achieve this object, a thermal shield for preventing radiant heat from an exhaust pipe from being transmitted to an oil pump is securely clamped to a support plate portion of a bracket which is disposed contiguous to the thermal shield. The thermal shield and the bracket are provided with an engaging protrusion portion and a positioning hole respectively. The thermal shield and the bracket are positioned through engagement of the engaging protrusion portion with the positioning hole.

8 Claims, 5 Drawing Sheets

MOUNTING STRUCTURE OF THERMAL SHIELD FOR OIL PUMP

INCORPORATION BY REFERENCE

The disclosure of Japanese Patent Application No. HEI 11-216519 filed on Jul. 30, 1999 including the specification, drawings and abstract is incorporated herein by reference in its entirety.

BACKGROUND OF THE INVENTION

1. Field of the Invention

The present invention relates to a mounting structure of a thermal shield for an oil pump which is disposed, for example, in a motor vehicle.

2. Description of the Related Art

In general, an oil pump which is disposed in a motor vehicle or the like is used, for example, as a power source of a vehicular power steering device. This oil pump force-feeds hydraulic fluid to the device while being driven by an engine and causes hydraulic fluid to circulate through a system employing the power steering device. Protection needs to be provided for such an oil pump so as to prevent the temperature of hydraulic fluid in the system from rising, for example, due to radiant heat from a heat source such as an exhaust pipe. Thus, in order to prevent radiant heat from the heat source from being transmitted to the oil pump, the thermal shield is disposed between the oil pump and the heat source.

As the related art, there is shown in FIG. 10 a mounting structure of a thermal shield for an oil pump wherein a thermal shield 31 is mounted in the vicinity of an oil pump 32. The oil pump 32 is mounted to a cylinder block 35 while being sandwiched between a pair of brackets 33 (only one of the brackets 33 is shown in FIG. 10). A thermal shield 31, which is configured to cover a lateral surface of the oil pump 32, is securely mounted to an outer surface of the bracket 33 on the side of the heat source by means of more than two bolts 34, in such a manner that the thermal shield 31 is prevented from moving due to vibrations from the cylinder block 35. In this manner, the thermal shield 31 shields radiant heat from the heat source.

However, the related art wherein the thermal shield 31 is securely mounted at more than two points to the oil pump 32 or the bracket 33 is problematic in that the number of parts is great and that the cost for mounting the thermal shield 31 is high.

SUMMARY OF THE INVENTION

It is an object of the present invention to provide a mounting structure of a thermal shield for an oil pump which makes it possible to securely mount the thermal shield at one point with high reliability and at a low cost.

To solve the aforementioned problem, according to an aspect of the present invention, there is provided a mounting structure of a thermal shield for an oil pump, wherein the thermal shield which is disposed between the oil pump and a heat source and which prevents radiant heat from the heat source from being transmitted to the oil pump is mounted to a support portion, wherein the thermal shield is securely mounted at one point to the support portion, and wherein a fixture member disposed contiguous to the thermal shield and the thermal shield are provided with positioning portions and are engaged with each other to be positioned at the positioning portions.

In this construction, the thermal shield is mounted at one point to the support portion, and positioning portions of the fixture member and the thermal shield are engaged with each other to position the thermal shield. Thus, the number of required parts is small. As a result, the thermal shield can securely be mounted at one point to the support portion with high reliability and at a low cost.

In the aforementioned aspect of the present invention, the positioning portion of the fixture member and the positioning portion of the thermal shield may be engaged with each other with a pre-load being applied thereto by pre-load application means which is provided at one of the positioning portions.

In this construction, the positioning portion of the fixture member and the positioning portion of the thermal shield are engaged with each other with a pre-load being applied thereto by pre-load application means. Thus, the positioning portions of the thermal shield and the fixture member are integrated with each other. The thermal shield is inhibited from vibrating relative to the fixture member, for example, due to vibrations from the engine. As a result, the positioning portions are prevented from being disengaged from each other.

In the aforementioned aspect of the present invention, one of the positioning portions of the fixture member and the thermal shield may be a concave portion, and the other may be a protrusion portion which is engaged into the concave portion.

In this construction, the protrusion portion is surely engaged into the concave portion. Therefore, the thermal shield is prevented from rotating integrally when fixed at one point to the support portion.

In the aforementioned aspect of the present invention, the protrusion portion engaged into the concave portion may abut on a peripheral edge of the concave portion.

In this construction, the protrusion portion is in line contact with the concave portion. Therefore, it is possible to prevent chatter from being generated in the thermal shield, for example, due to vibrations from the engine.

In the aforementioned aspect of the present invention, the pre-load application means may be elasticity of the thermal shield itself.

In this construction, a pre-load is applied to the positioning portions due to the elasticity of the thermal shield itself. Therefore, it is possible to apply a pre-load to the thermal shield without increasing the number of parts.

BRIEF DESCRIPTION OF THE DRAWINGS

The foregoing and further objects, features and advantages of the present invention will become apparent from the following description of a preferred embodiment with reference to the accompanying drawings, wherein.

DESCRIPTION OF PREFERRED EMBODIMENT

Hereinafter, a mounting structure of a thermal shield for an oil pump for a vehicular power steering device in accordance with one embodiment of the present invention will be described with reference to FIGS. 1 through 3.

Figure 1:
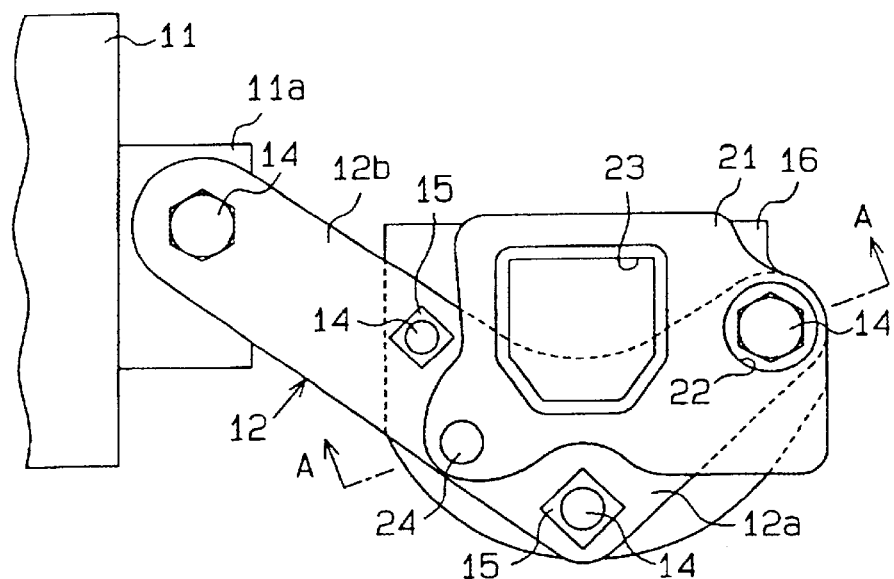
FIG. 1 is a rear view of a mounting structure of a thermal shield for an oil pump in accordance with an embodiment of the present invention.
Figure 2:
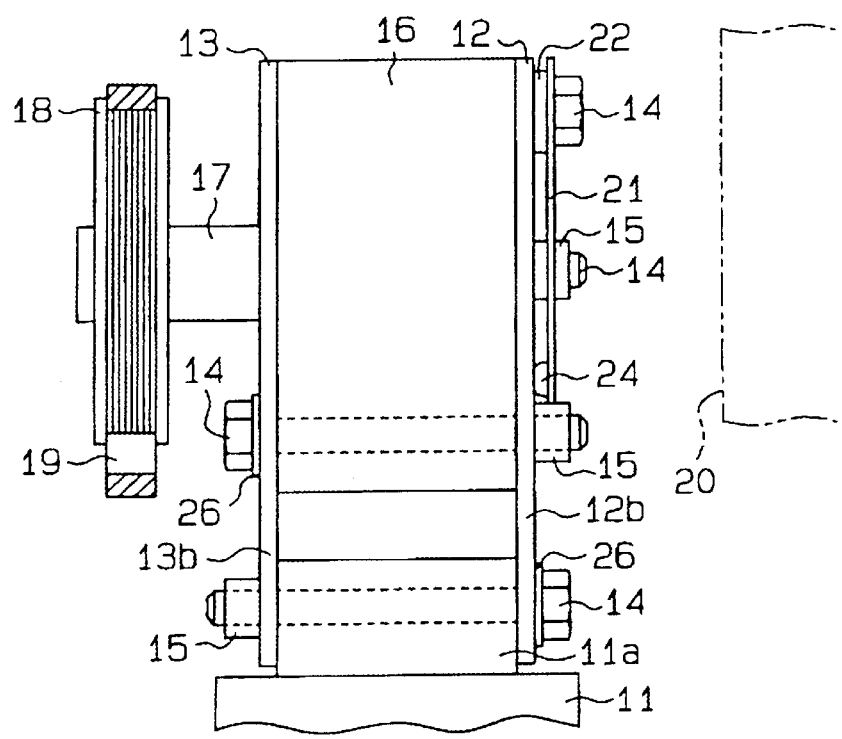
FIG. 2 is a plan view of the embodiment.

As shown in FIGS. 1 and 2, brackets 12, 13, which are designed as a pair of fixture members, are securely clamped at their mounting plate portions 12b, 3b to opposed lateral surfaces of a mounting portion 11a of a cylinder block 11 by means of bolts 14 and nuts 15. Each of the brackets 12, 13 is formed in the shape of L and composed of the mounting plate portion 12b (only the side of the bracket 12 is shown in FIG. 1) and a support plate portion 12a which is provided on the tip end side to serve as a support portion (only the side of the bracket 12 is shown in FIG. 1). An oil pump 16 is sandwiched between the brackets 12, 13 and securely mounted by using nuts 15 to clamp a pair of bolts 14 inserted through the mounting plate portion 12b of the bracket 12.

In the oil pump 16, an input shaft 17 protrudes from the lateral surface of one of the brackets 13 (on the left side in FIG. 2), and a pulley 18 is fixed to the input shaft 17. An endless V-belt 19, which is wound around a crank pulley (not shown) of a crankshaft (not shown), is wound around the pulley 18.

In the other bracket 12, an exhaust pipe 20 designed as a heat source mounted to an engine is disposed on the other side of the pulley.

A generally rectangular thermal shield 21 formed of an elastic metal plate is fixed to the support plate portion 12a of the bracket 12 and arranged to cover the lateral surface of the oil pump 16 on the side of the exhaust pipe 20. As shown in FIG. 3, the thermal shield 21 is generally downturned from one diagonal end (hereinafter referred to as a mounting end) to the other diagonal end.

A mounting concave portion 22, a reinforcing concave portion 23, and an engaging protrusion portion 24 designed as a positioning portion and a protrusion portion are press-molded towards the bracket 12 in the mounting end, a central portion, and the other end of the thermal shield 21 respectively. The mounting concave portion 22 of the thermal shield 21 is formed in the shape of a closed-end cylinder. By inserting a bolt 14 through a through-hole 22a formed in a bottom surface of the mounting concave portion 22 and screwing the bolt 14 into a threaded hole 25 formed in the support plate portion 12a, the thermal shield 21 is mounted to the bracket 12. A reference numeral 26 denotes a washer passed through the bolt 14.

Further, the tip end of the engaging protrusion portion 24 of the thermal shield 21 is formed in the shape of a hemisphere. The engaging protrusion portion 24 is engaged into a positioning hole 27 which is provided in the mounting plate portion 12b of the bracket 12 and which is designed as a positioning portion and a concave portion having a circular cross-section. An outer periphery of the spherical surface of the engaging protrusion portion 24 is in line contact with a peripheral edge of the positioning hole 27. That is, the positioning hole 27 is slightly smaller in diameter than the tip end of the engaging protrusion portion 24.

Figure 3A:
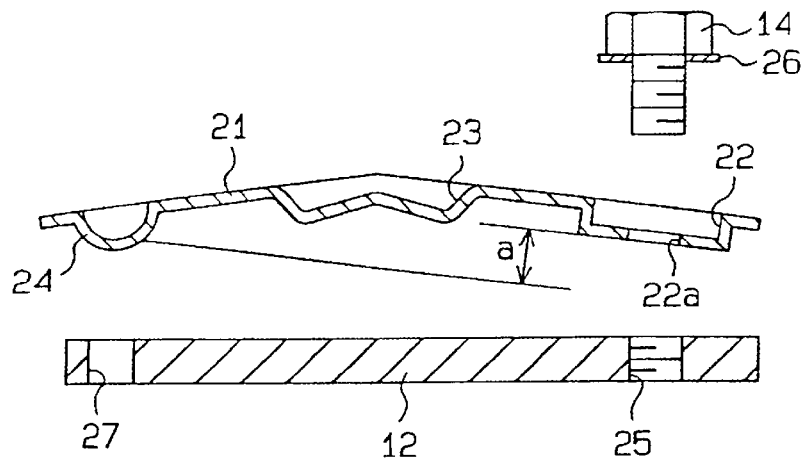
FIG. 3(a) is an exploded and enlarged cross-sectional view of the essential part of the embodiment taken along a line A—A shown in FIG. 1.
Figure 3B:
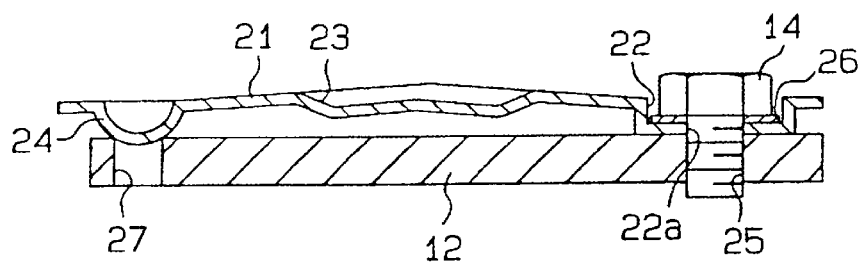
FIG. 3(b) is an enlarged cross-sectional view of the essential part after the mounting operation.

Further, as shown in FIG. 3(a), the entire thermal shield 21 is bent as described above. Thus, a portion of the thermal shield 21 which contacts the positioning hole 27 of the engaging protrusion portion 24 is offset from the mounting concave portion 22 by the length of a. The thermal shield 21 is securely clamped to the bracket 12 by means of the bolt 14. Thereby the engaging protrusion portion 24 is engaged into the positioning hole 27 against an elastic force of the thermal shield 21 and stopped in the positioning hole 27. As shown in FIG. 3(b), the offset amount is reduced. In this case, the thermal shield 21 itself that has been bent as described above constitutes pre-load application means. Further, aside from a contact portion of the bottom outer surface of the mounting concave portion 22 on the side of the bracket 12 and a portion of the engaging protrusion portion 24 which is engaged into the positioning hole 27, the thermal shield 21 is spaced apart from the bracket 12. In other words, there is a clearance formed between the thermal shield 21 and the bracket 12.

Next, the operation of the mounting structure of the thermal shield for the oil pump that is constructed as described above will be described.

In the case where the thermal shield 21 is mounted to the support plate portion 12a of the bracket 12, the thermal shield 21 is positioned such that the engaging protrusion portion 24 is engaged into the positioning hole 27. The bolt 14 is then inserted through the through-hole 22a in the mounting concave portion 22, and the thermal shield 21 is securely clamped to the support plate portion 12a of the bracket 12 by the bolt 14.

If the bolt 14 is tightened, the engaging protrusion portion 24 comes into abutment on the positioning hole 27. Therefore, the thermal shield 21 that has been downturned is elastically deformed, and a pre-load is applied to the engaging protrusion portion 24 towards the positioning hole 27. Thus, the thermal shield 21 is prevented from rotating integrally when tightening the bolt. As a result, the thermal shield 21 is securely clamped to a predetermined position.

Further, since the engaging protrusion portion 24 is formed in the shape of a hemisphere, the engaging protrusion portion 24 is centered without being disengaged from the positioning hole 27 due to application of the pre-load. The engaging protrusion portion 24 is engaged into the positioning hole 27 with a pressure being applied to the peripheral edge thereof.

In addition, in the case where vibrations have been transmitted from the cylinder block 11 through the bracket 12 with the oil pump 16 mounted to the vehicle, the hemispherical engaging protrusion portion 24 to which a pre-load is applied is surely engaged with the peripheral edge of the positioning hole 27 and substantially integrated therewith. Accordingly, the engaging protrusion portion 24 is prevented from being disengaged from the positioning hole 27, and generation of chatter (chattering vibrations or chattering noise) in the thermal shield 21 is prevented.

There is a clearance formed between the thermal shield 21 and the bracket 12. Further, since the thermal shield 21 and the bracket 12 are in contact with each other only at the bottom surface of the mounting concave portion 22 and at a portion of the engaging protrusion portion 24 which abuts on the positioning hole 27. Therefore, radiant heat from the exhaust pipe 20 is unlikely to be transmitted to the oil pump 16. Thus, the temperature of hydraulic fluid in the oil pump 16 is inhibited from rising.

The aforementioned embodiment makes it possible to achieve the following features.

(1) In the aforementioned embodiment, the thermal shield 21 is fixed to the bracket 12 by means of one bolt. The engaging protrusion portion 24 of the thermal shield 21 is engaged with the positioning hole 27 of the bracket 12 to determine a position of the thermal shield 21. Therefore, the number of parts is small. Thus, the thermal shield 21 can surely be mounted and secured at one point and at a low cost.

(2) In the aforementioned embodiment, the engaging protrusion portion 24 is engaged into the positioning hole 27 while being subjected to a pre-load. Because the engaging protrusion portion 24 is substantially integrated with the positioning hole 27, the engaging protrusion portion 24 is prevented from being disengaged from the positioning hole 27 due to vibrations and the like transmitted from the cylinder block 11 through the bracket 12.

(3) In the aforementioned embodiment, since the engaging protrusion portion 24 is engaged into the positioning hole 27, the thermal shield 21 can be prevented from rotating integrally when tightening the bolt.

(4) In the aforementioned embodiment, the engaging protrusion portion 24 is in line contact with the peripheral edge of the positioning hole 27 while being subjected to a pre-load. Thus, generation of chatter in the thermal shield 21 can be prevented.

(5) In the aforementioned embodiment, the thermal shield 21 has elasticity in itself and thus applies a pre-load to the engaging protrusion portion 24. Therefore, it is possible to apply a pre-load without increasing the number of parts.

(6) In the aforementioned embodiment, there is a clearance formed between the thermal shield 21 and the bracket 12. Further, aside from the bottom surface of the mounting concave portion 22 and the portion of the engaging protrusion portion 24 which is in line contact with the positioning hole 27, the thermal shield is out of contact with the bracket 12. Hence, the temperature of hydraulic fluid can be inhibited from rising.

(7) In the aforementioned embodiment, the engaging protrusion portion 24 is in the shape of a hemisphere. Thus, when mounting the thermal shield 21, the thermal shield 21 can be centered with a pre-load being applied thereto, while preventing the engaging protrusion portion 24 from being disengaged from the positioning hole 27.

The aforementioned embodiment may be modified as follows.

Figure 4:
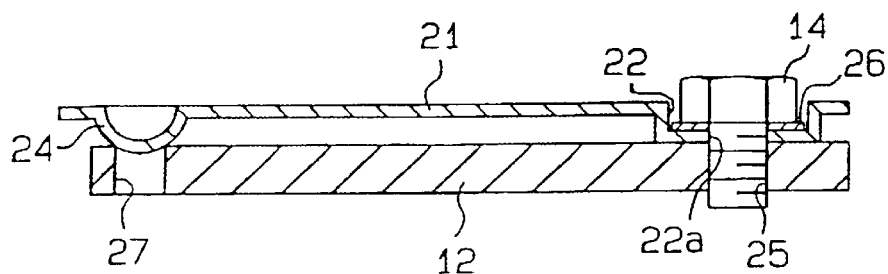
FIG. 4 is an enlarged cross-sectional view of the essential part in another example.

(1) In the aforementioned embodiment, the thermal shield 21 is downturned. However, the thermal shield 21 may also be formed without being bent as shown in FIG. 4. In this case, the engaging protrusion portion 24 is not engaged with the peripheral edge of the positioning hole 27 while being subjected to a pre-load. Nevertheless, since the engaging protrusion portion 24 is engaged into the positioning hole 27, this also makes it possible to achieve substantially the same effects as those mentioned in (1), (3) and (6) of the aforementioned embodiment.

Figure 5A:
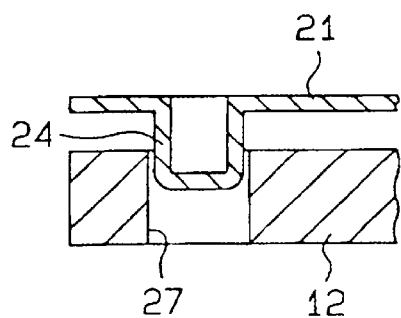
FIG. 5(a) and FIG. 5(b) are enlarged cross-sectional views of the essential part in different examples.
Figure 5B:
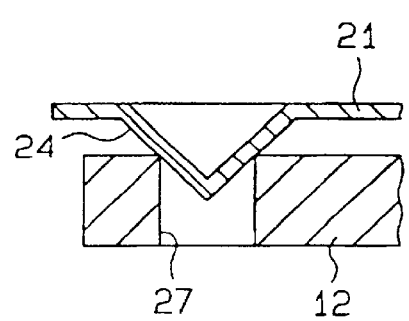

(2) In the aforementioned embodiment, the engaging protrusion portion 24 is formed in the shape of a hemisphere. However, on condition that the thermal shield 21 generally be downturned so as to apply a pre-load to the engaging protrusion portion 24 as shown in FIG. 5(a), the engaging protrusion portion 24, which is to be engaged into the positioning hole 27, may be formed in the shape of either a cylinder or a circular cone as shown in FIG. 5(b). If the engaging protrusion portion 24 is in the shape of a cylinder, it is formed smaller in diameter than the positioning hole 27 so as to be inserted thereinto. If the engaging protrusion portion 24 is in the shape of a circular cone, it is formed in such a dimension as to be in line contact with the positioning hole 27. In the former case, it is possible to achieve substantially the same effects as those in (1), (2), (3), (5) and (6) of the aforementioned embodiment. In the latter case, it is possible to achieve substantially the same effects as those in (1) through (6) of the aforementioned embodiment.

Figure 6A:
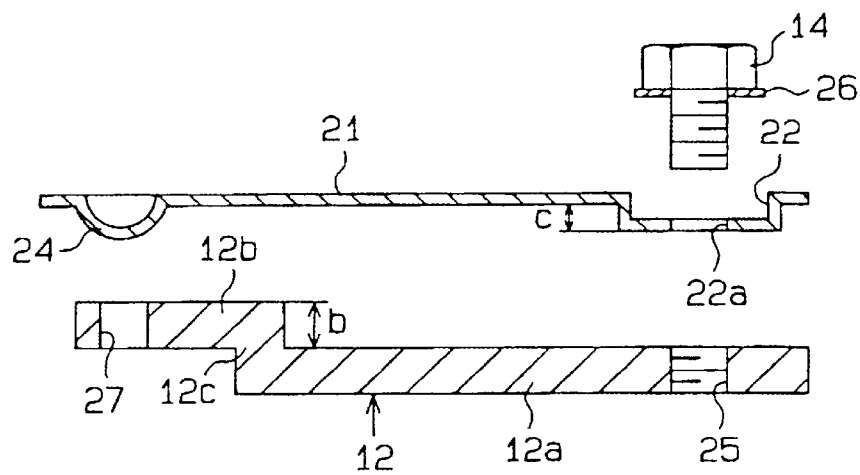
FIG. 6(a) is an exploded and enlarged cross-sectional view of the essential part in another example.
Figure 6B:
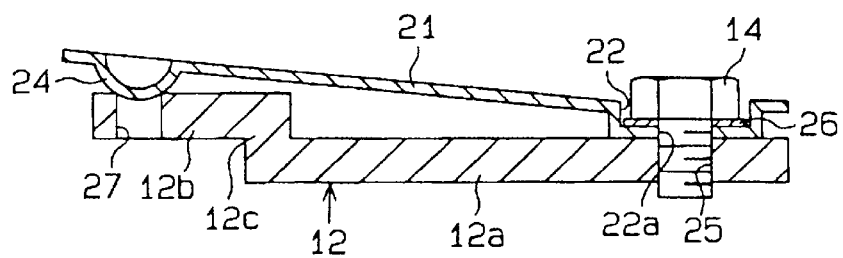
FIG. 6(b) is an enlarged cross-sectional view of the essential part after the mounting operation.

(3) In the aforementioned embodiment, the thermal shield 21 which has elasticity is downturned so that the engaging protrusion portion 24 is subjected to a pre-load when tightening the bolt. However, as long as a pre-load can be applied to the engaging protrusion portion 24, the thermal shield 21 may be constructed as shown in FIG. 6(a). Here, the thermal shield 21 is formed without being bent, and a step portion 12c is formed in the vicinity of the mounting plate portion 12b between the mounting plate portion 12b and the support plate portion 12a. In such a case, the length b from the surface of the support plate portion 12a on the side of the thermal shield 21 to the surface of the mounting plate portion 12b on the side of the thermal shield 21 (the height of the step) is made greater than a protrusion amount c of the mounting concave portion 22. In such a construction, when the thermal shield 21 is mounted to the bracket 12 as shown in FIG. 6(b), a pre-load is applied to the engaging protrusion portion 24 due to an elastic force of the thermal shield 21. As a result, it is possible to achieve substantially the same effects as those of the aforementioned embodiment. Thus, in this case, the thermal shield 21 having elasticity and the step portion 12c of the bracket 12 constitute pre-load application means.

Figure 7A:
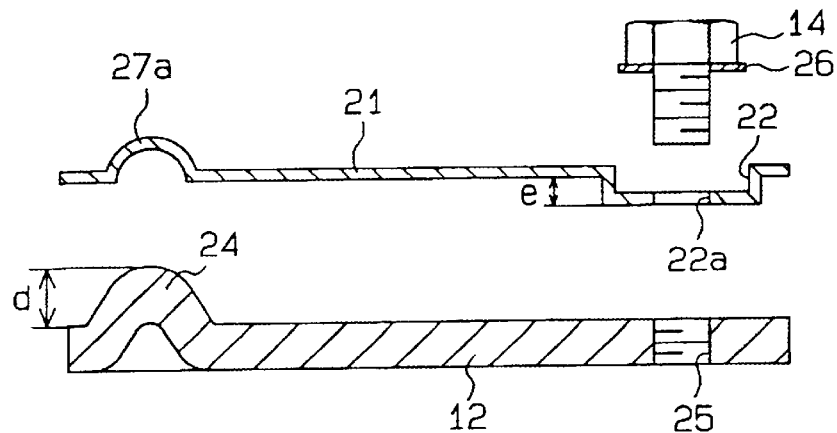
FIG. 7(a) is an exploded and enlarged cross-sectional view in another example.
Figure 7B:
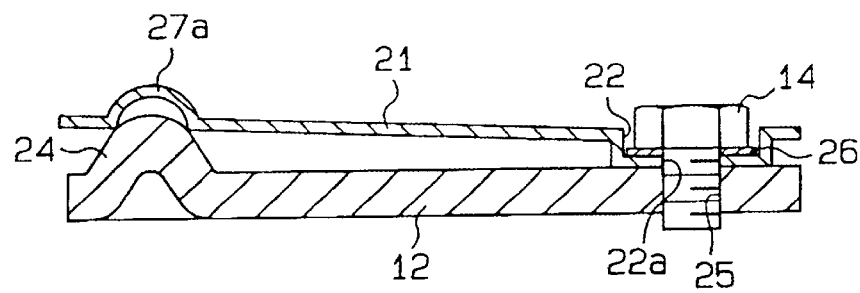
FIG. 7(b) is an enlarged cross-sectional view of the essential part after the mounting option.

(4) In the aforementioned embodiment, the engaging protrusion portion 24 is formed in the thermal shield 21, and the positioning hole 27 into which the engaging protrusion portion 24 is engaged is formed in the bracket 12. However, as shown in FIG. 7(a), press molding may be carried out to form a positioning concave portion 27a in the thermal shield 21 and to form the engaging protrusion portion 24 in the bracket 12. In such a case, in order to apply a pre-load to the positioning concave portion 27a due to an elastic force of the thermal shield 21, the engaging protrusion portion 24 is protrusively formed as shown in FIG. 7(a) such that the length d from the surface of the bracket 12 on the side of the thermal shield 21 to the apex of the engaging protrusion portion 24 is longer than a protrusion amount e of the mounting concave portion 22. In this construction, as shown in FIG. 7(b), a pre-load is applied to the positioning concave portion 27a due to an elastic force of the thermal shield 21.

Figure 8A:
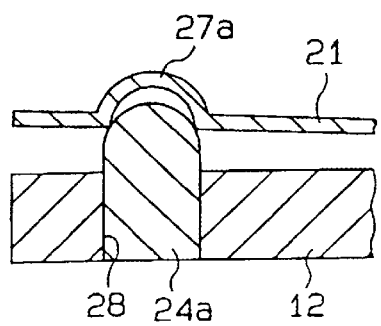
FIG. 8(a) and FIG. 8(b) are enlarged cross-sectional views of the essential part in different examples.
Figure 8B:
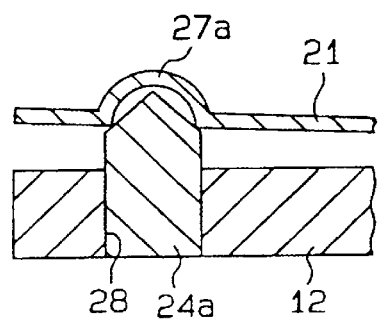

Further, instead of press-molding the bracket 12 such that the engaging protrusion portion 24 protrudes, an engagement protrusion member 24a formed of a separate member may securely be fitted into a plug-in hole 28 provided in the bracket 12 as shown in FIG. 8. In this case, for line contact with the peripheral edge of the positioning concave portion 27a, the tip end of the engaging protrusion member 24a may be formed in the shape of either a hemisphere as shown in FIG. 8(a) or a circle as shown in FIG. 8(b). This also makes it possible to achieve substantially the same effects as those of the aforementioned embodiment.

(5) In the aforementioned embodiment, the thermal shield 21 is securely clamped to the bracket 12. However, the thermal shield 21 may also be clamped securely to the oil pump 16 through the bracket 12 (not shown). That is, the threaded hole 25 of the bracket 12 is replaced by a through-hole, and a threaded hole is formed in the oil pump 16. Then, the bolt 14 is inserted through the through-hole 22a in the thermal shield 21 and the through-hole in the bracket 12 and screwed into the threaded hole in the oil pump 16. In this manner, the thermal shield 21 can securely be clamped to the oil pump 16 through the bracket 12. Alternatively, the threaded hole 25 in the bracket 12 is replaced by a through-hole, and a through-hole is formed in the oil pump 16. Then, the bolt 14 is inserted through the through-hole 22a in the thermal shield 21, the through-hole in the bracket 12, and the through-hole in the oil pump 16 and tightened by means of a nut. In this manner, the thermal shield 21 can securely be clamped to the oil pump 16 through the bracket 12. This also makes it possible to achieve substantially the same effects as those of the aforementioned embodiment.

Figure 9:
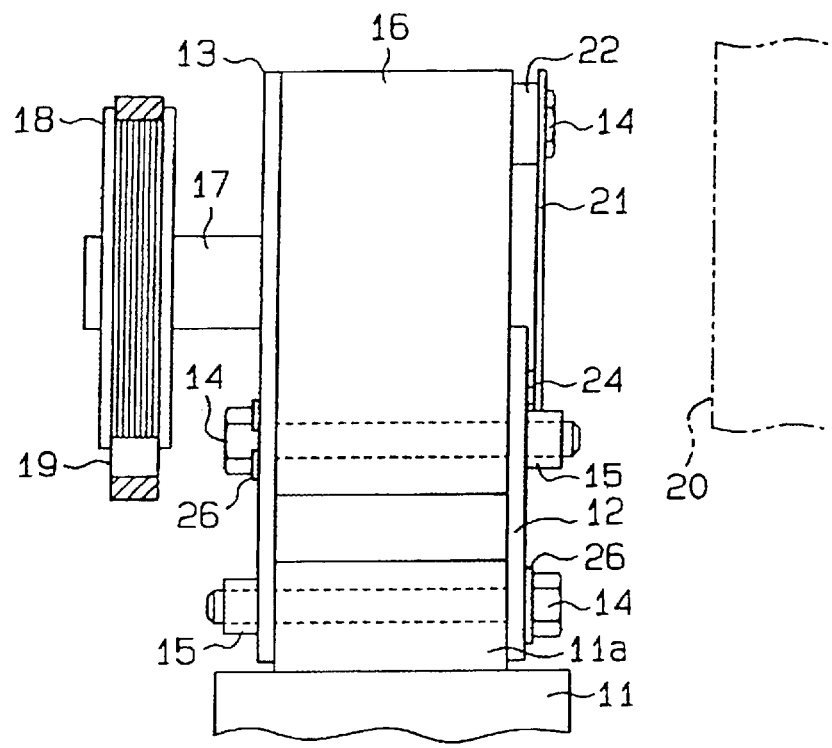
FIG. 9 is a plan view in another example.
Figure 10:
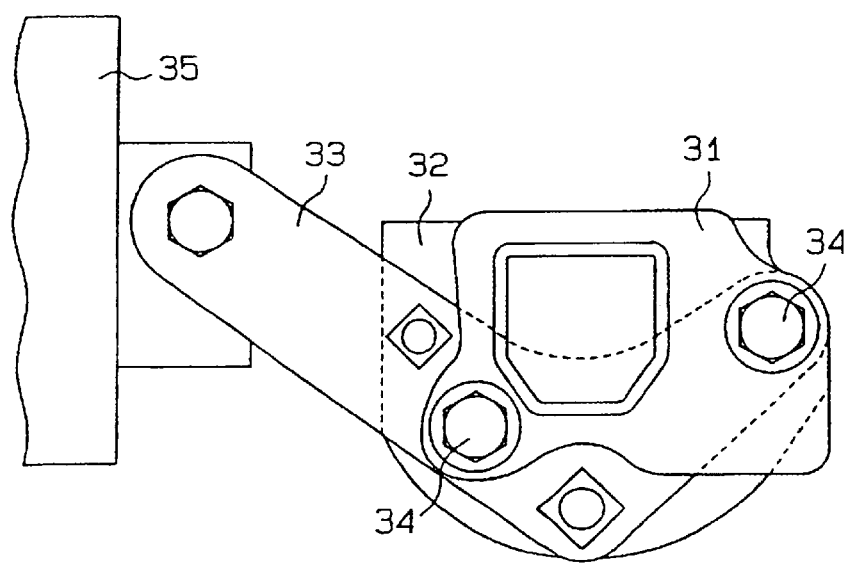
FIG. 10 is a rear view of a mounting structure of a thermal shield for an oil pump in accordance with the related art.

(6) In the aforementioned embodiment, the thermal shield 21 is provided on the support plate portion 12a of the bracket 12. However, as shown in FIG. 9, the thermal shield 21 may directly be mounted to the oil pump 16. In this case, the mounting portion of the oil pump 16 serves as the support portion. This also makes it possible to achieve substantially the same effects as those of the aforementioned embodiment.

(7) In the aforementioned embodiment and other examples, the bracket 12 is interposed between the thermal shield 21 and the oil pump 16. However, this construction is adopted just because the oil pump 16 is mounted to the cylinder block 16. Thus, the present invention can also be implemented in the case where the oil pump 16 itself serves as a support portion and a fixture member without interposing the bracket 12 (not shown). That is, the thermal shield 21 may be provided with the engaging protrusion portion 24 shown in FIGS. 1 through 6, and the oil pump 16 may be provided with the positioning hole 27 and the step portion 12c. Alternatively, the thermal shield 21 may be provided with the positioning concave portion 27a shown in FIGS. 7 and 8, and the oil pump 16 may be provided with the engaging protrusion portion 24 and the engaging protrusion member 24a. This also makes it possible to achieve substantially the same effects as those of the aforementioned embodiment.

(8) Instead of the bracket 12, another member contiguous to the oil pump 16 may be used as a fixture member.

Next, technical ideas other than those of the claimed invention which can be understood from the aforementioned embodiment and examples will be described hereinafter in conjunction with their effects.

(1) The fixture member may be provided with the support portion. This makes it possible to reduce the number of parts and manufacture the fixture member without considering the possibility of the thermal shield 21 coming into contact with the fixture member.

(2) Aside from the support portion and the positioning portion of the fixture member, the thermal shield 21 may be formed to be spaced apart from other components with a clearance. In this construction, the thermal shield 21 is in contact with the support portion and the fixture member over a small area. Hence, radiant heat from the heat source can further be inhibited from being transmitted from the thermal shield 21 to the oil pump 16.

While the present invention has been described with reference to what is presently considered to be a preferred embodiment thereof, it is to be understood that the present invention is not limited to the disclosed embodiment or construction. On the contrary, the present invention is intended to cover various modifications and equivalent arrangements. In addition, while the various elements of the disclosed invention are shown in various combinations and configurations which are exemplary, other combinations and configurations, including more, less or only a single embodiment, are also within the spirit and scope of the present invention.

What is claimed is:

1. A mounting structure of a thermal shield and an oil pump to an engine having a heat source, comprising:

at least one support element connected to an engine;

at least one attachment device attaching an oil pump to the at least one support element, wherein exactly one said attachment device further attaches a thermal shield to the at least one support element; and engaging positioning elements on the thermal shield and the support element, wherein one of said engaging positioning elements is a concave portion, and the other of said engaging positioning elements is a protrusion engaged with the concave portion.

2. A mounting structure of a thermal shield and an oil pump to an engine having a heat source, comprising:

at least one support element connected to an engine;

attachment means for attaching an oil pump to the at least one support element, wherein said attachment means further attaches a thermal shield to the at least one support element; and engaging positioning means for positioning said thermal shield on said support element, wherein said engaging positioning means does not attach the oil pump to the at least one support element, wherein said engaging positioning means comprise a concave portion and a protrusion engaged with the concave portion.

3. The mounting structure according to claim 1 wherein at least one of said engaging positioning elements includes pre-load application means.

4. The mounting structure according to claim 2 wherein at least one of said engaging positioning means includes pre-load application means.

5. The mounting structure according to claim 1 wherein the protrusion engaged with the concave portion abuts a peripheral edge of the concave portion.

6. The mounting structure according to claim 2 wherein the protrusion engaged with the concave portion abuts a peripheral edge of the concave portion.

7. The mounting structure according to claim 3 wherein the pre-load application means comprises the elasticity of the thermal shield.

8. The mounting structure according to claim 4 wherein the pre-load application means comprises the elasticity of the thermal shield.

* * * * *